United States Patent [19]

Saracini

[11] Patent Number: 4,596,379

[45] Date of Patent: Jun. 24, 1986

[54] METHOD OF STRETCHING HIGH-TENSION ELECTRIC POWER LINES AND A DEVICE FOR PERFORMING THE METHOD

[75] Inventor: Alessandro Saracini, Rome, Italy

[73] Assignee: Tesaut S.p.A., Italy

[21] Appl. No.: 393,426

[22] Filed: Jun. 29, 1982

[51] Int. Cl.⁴ .............................................. B65H 59/00
[52] U.S. Cl. ..................... 254/134.3 PA; 254/134.3 R
[58] Field of Search ................ 254/134.3 R, 134.3 PA

[56] References Cited

U.S. PATENT DOCUMENTS

| | | | |
|---|---|---|---|
| 2,155,053 | 4/1939 | Kuenzi | 254/134.3 PA |
| 3,271,009 | 9/1966 | Wright et al. | 254/134.3 R |
| 4,301,994 | 11/1981 | Lindsey | 254/134.3 PA |

FOREIGN PATENT DOCUMENTS

| | | | |
|---|---|---|---|
| 996919 | 8/1974 | Canada | 254/134.3 R |
| 1059523 | 6/1959 | Fed. Rep. of Germany | |
| 147703 | 2/1983 | Japan | 254/134.3 R |
| 584378 | 12/1977 | U.S.S.R. | 254/134.3 PA |
| 838844 | 6/1981 | U.S.S.R. | 254/134.3 R |

*Primary Examiner*—Frederick R. Schmidt
*Assistant Examiner*—Judy J. Hartman
*Attorney, Agent, or Firm*—Burns, Doane, Swecker & Mathis

[57] ABSTRACT

The invention relates to a system of stretching overhead electric lines, more particularly high-tension lines, according to which a pilot cord or haulage cable is positioned in conventional manner over a set of top pulleys positioned at the highest point on each pylon in the line, and is then used to pull a first haulage cable or guard cable together with at least one other supplementary haulage cable, and/or supplementary guard cable. Each supplementary cable, after passing the top pulleys on which the first haulage cable or guard cable have been laid, is slid and guided downwards until it rests on pulleys underneath. In this manner, each further haulage cable is already positioned for drawing a conductor or bunch of conductors and other haulage cables if required. In the aforementioned system, it is no longer necessary to position a pilot cord for each conductor or bunch of conductors to be tensioned, but it is sufficient to position a single pilot cord on the top pulleys of the pylons, since all the conductors or bundles of conductors and/or further haulage cables are subsequently positioned automatically, starting from the pilot cord or first haulage cable, during the subsequent stage of tensioning.

25 Claims, 21 Drawing Figures

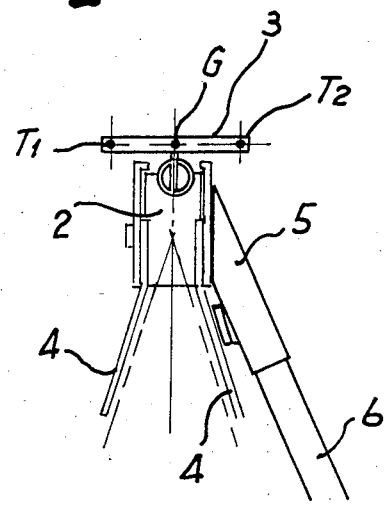
Fig. 16a
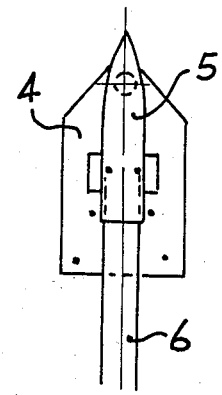
Fig. 16b
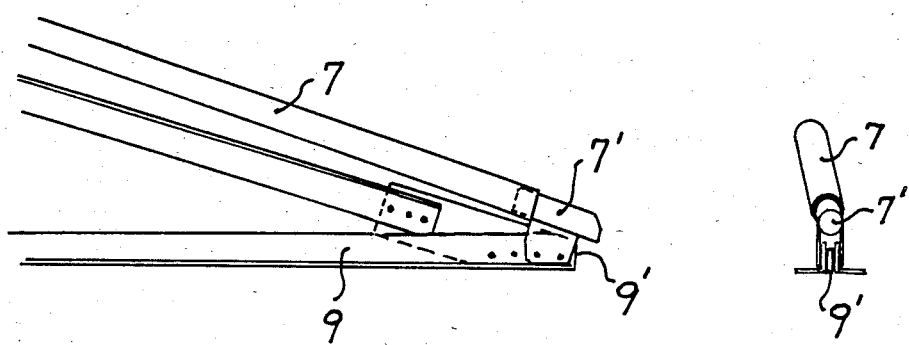
Fig. 17a
Fig. 17b

METHOD OF STRETCHING HIGH-TENSION ELECTRIC POWER LINES AND A DEVICE FOR PERFORMING THE METHOD

In the following description of the prior art and the present invention, the terms "pilot cord", "haulage cable" and "service cord", will be utilized. It is to be understood that these terms, which are known to those skilled in the art, are primarily descriptive of the function of the respective cords or cables. However, it is to be understood that the major difference between these cords or cables is the cross-sectional diameter which is determined by their function, i.e., the time at which they are utilized during the stringing of the conductors, and/or the number of additional cords or cables, and the type of those cables, which the specified cord is designed to pull. Consequently, the terms may be utilized interchangably and/or alternatively depending upon the particular application to which the present invention is applied.

BACKGROUND OF THE INVENTION

As is well known to all experts in the construction of electric power lines, the usual modern method of tensioning electric conductors, either singly or in bundles, on pylons is the "controlled tension" method, using "pilot cords" in the initial stage.

In the more conventional method, the pilot cord is first substantially tensioned at ground level and then raised and conveyed over the pulleys suspended from the successive pylons in the line and then tensioned.

The actual tensioning operation begins only after the pilot cord has been tensioned and is consequently suspended between two pylons along the line. The actual tensioning operation normally comprises the following stages:

The pilot cord is recovered from one end whereas the other end is coupled to a haulage cable which, together with the pilot cord, is maintained under constant tension and is therefore always raised from the ground. The haulage cable is thus moved forward and progressively takes the place of the pilot cord on the pulleys.

Next, the haulage cable is recovered from one end whereas the other end is coupled to the electric conductor or bundle of conductors which, together with the haulage cable, are as before kept under constant tension and raised from the ground. The conductors are thus moved forward and progressively take the place of the haulage cable on pulleys. Finally, the pulleys conveying the pilot cord, haulage cable and conductors are replaced by known suspension insulators, to which the conductors are finally and permanently attached.

This method encounters considerable difficulties which may readily be understood and are well-known to those skilled in the art. They relate to the initial tensioning of the pilot cord and to the stretching of the haulage cables and conductors under constant tension.

The invention is mainly concerned with the problems and difficulties of tensioning the pilot cord. Although the tensioning process is relatively easy in flat open ground, it becomes more difficult if the route of the line goes through crops, which will inevitably be damaged, or woods, in which case it will be necessary to cut down entire lines of trees, particularly those with high trunks. The difficulties will be correspondingly greater if the route is still more irregular, as is frequently the case in mountainous regions or where the line crosses other structures such as streets, rivers, power lines, built-up areas or the like.

In an attempt to obviate these difficulties and the associated long periods of work, it has been proposed to use helicopters to tension the pilot cords. A helicopter moves along the route of the line above the pylons and gradually unwinds the pilot cord, which is conveyed by operators on the pylons over pulleys suspended therefrom or automatically runs on specially-shaped pulleys.

After the pilot cords have been stretched by the aforementioned method, the haulage cables followed by the conductors and/or bundles of conductors are stretched under constant tension in the aforementioned manner.

This method of stretching the pilot cords has the great advantage of reducing damage to vegetation along the route and thus shortening the time required, but is not free from disadvantages.

More particularly, the helicopter pilots have to be particularly skillful, firstly because the helicopter motion is opposed by the pilot cord, which is at least partly under tension; secondly because the pilot cord must be positioned on the pylons with high accuracy so that the operators can secure it or so that it can automatically run on the special pulleys; thirdly, owing to the need for accuracy, the helicopter has to fly at a very low altitude over the pylons or even remain still, with evident difficulty and danger; and last but not least, since the most important electric lines normally have six conductors or six bundles of conductors suspended from six brackets disposed at three different levels separated by several metres from one another, the difficulty and risk are multiplied by a factor of six (since one pilot cord has to be positioned for each conductor or bundle of conductors and one for the guard cable), or sometimes by an even higher factor if the helicopter, in order to accompany the pilot cords nearly as far as the lowest brackets, has to descend to an altitude at which the rotor blades are dangerously near the tip of the pylon or actually below it.

Of course, there is also the difficulty of manipulating large quantities of pilot cords and haulage cables. The helicopter and crew have to work for a long time, resulting in high depreciation and investment costs. For these reasons the aforementioned method and expenses are restricted to the most important lines for particularly difficult routes.

SUMMARY OF THE INVENTION

The invention, therefore, relates to a method of controlled tensioning of an overhead power line which substantially solves the problem of laying the pilot cord.

The system is of the kind in which two respective haulage cables are first conveyed over a series of pylons bearing conductors distributed along a given route, and more specifically are conveyed over at least two pulleys suspended from each pylon at the places where at least two conductors are attached at various levels, after which the conductors or bundles of conductors are pulled into position. The system is characterized substantially in that:

a pilot cord or haulage rope is disposed in conventional manner on the set of pulleys at the highest level;

the pilot cord or haulage rope is recovered from one end by running it over the set of high-level pulleys, whereas the other end is coupled to a primary cable and at least one supplementary cable;

the primary cable is guided into position along the groove of each pulley at the highest level and each supplementary cable is guided so as to run over the high-level pulleys and then slide slowly downwards and finally fall on to the lower-level pulleys; and each supplementary pulley positioned on the lower-level pulleys is used directly for drawing a conductor or bunch of conductors and simultaneously drawing another supplementary cable if required.

As can easily be seen, the system according to the invention greatly reduces and simplifies the preparatory work for tensioning the haulage cables. The conventional method has to be used only for positioning a single pilot cord or first haulage cable, more particularly the cable for pulling the guard cable or conductor at the highest level, whereas all the other haulage cables, i.e. those underneath, are automatically positioned during the progress of the work of tensioning the line. It can also easily be understood that in such cases the use of a helicopter, which is limited to a single cable disposed at the top of the pylons, becomes much easier and more rapid and is therefore quite economic and justifiable even on lines of secondary importance. This reduces the damage to vegetation underneath and the time taken for the work.

BRIEF DESCRIPTION OF THE DRAWINGS

Other characteristics and advantages of the system according to the invention will be clearer from the following description of some preferred embodiments, given by way of example only and illustrated in the accompanying drawings, in which:

FIGS. 16a, 16b, 17a and 17b show some constructional details of the top of the pylon in FIG. 1, and FIGS. 18a and 18b are views in plan and elevation respectively of a balance-beam device connecting the haulage cable to the bundle of conductors, with an attachment for an additional haulage cable.

DESCRIPTION OF THE PREFERRED EMBODIMENTS

As shown, a pulley 2 is mounted in freely rotatable manner at the top of a pylon 1 for a high-tension power line. A pilot cord (not shown) is disposed in conventional manner on pulley 2 and on all the other pulleys in the subsequent pylons along the line.

Preferably the pilot cord is laid by a helicopter, which can advantageously be used even for secondary lines, owing to the saving in time and the reduction of damage to the crops underneath. The reasons for this wider application, which have already been set out, are as follows:

only a single pilot cord has to be laid, and it is laid at the highest point of the pylon, thus clearly reducing and simplifying the work of the helicopter.

The invention, however, also includes the possibility of using, not the helicopter but the conventional methods of manually stretching the pilot cord, in which case all the advantages of the invention will likewise be obtained, as shown more clearly hereinafter, except of course for the speed of stretching the pilot cord or first haulage cable, which requires the use of a helicopter.

The top pilot cord is then recovered from one end by running it over the pulleys, whereas the other end is attached to a first haulage cable which, according to the conventional method as before, progressively takes the place of the pilot cord on the pulleys.

This may be regarded as the end of the preparatory stage before stretching all the other haulage cables for the other conductors of the line. The preparatory stage may be further greatly simplified at least in certain cases, by initial direct manual stretching of the first haulage cable.

Figure 1:
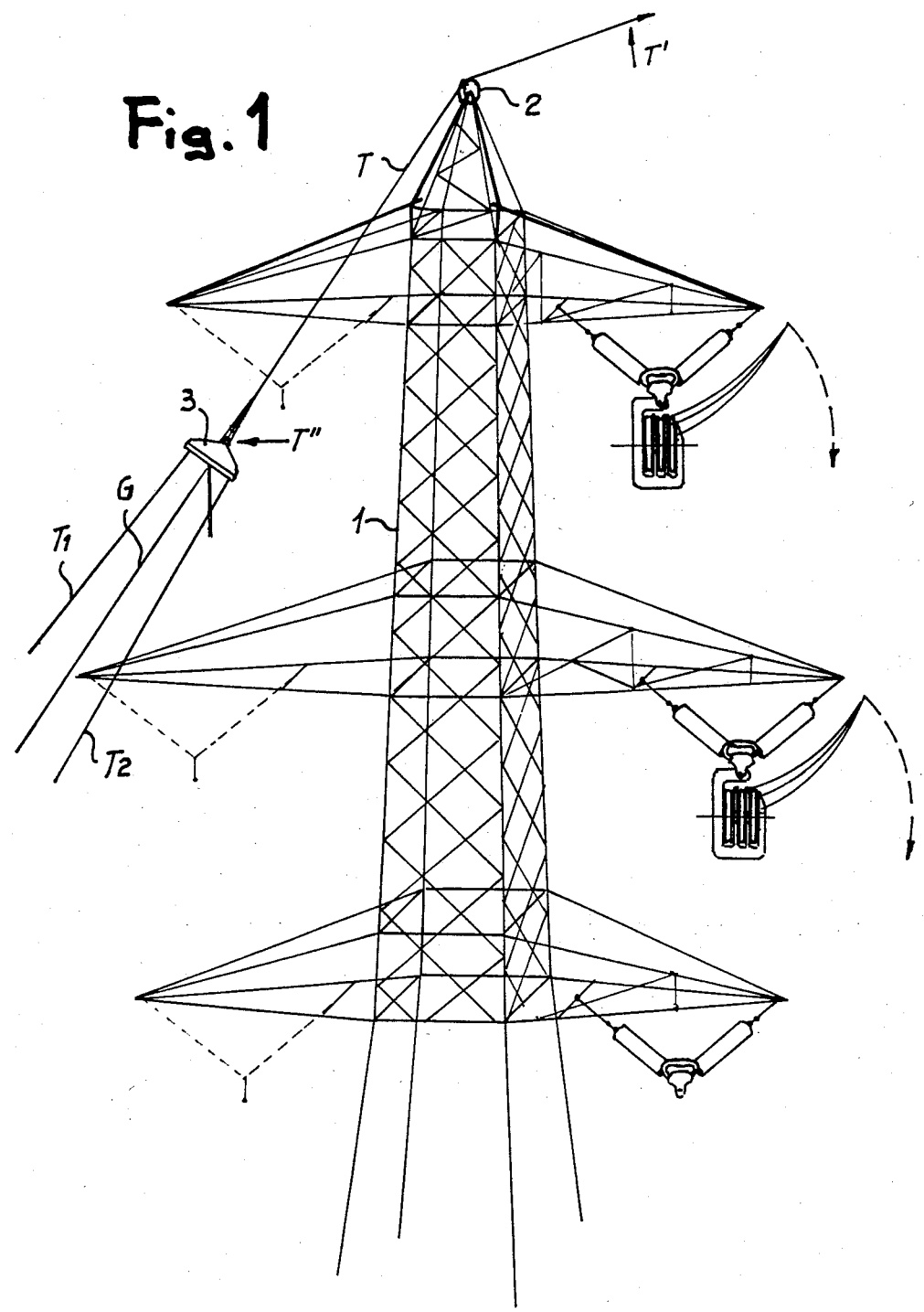
FIGS. 1 to 4 show a pylon having six brackets distributed at three levels, during four successive stages of the tensioning of a guard cable and two other haulage cables, starting from a first haulage cable.

FIG. 1 shows the next stage, the beginning of the recovery of the pilot cord and haulage rope T and the drawing of the guard cable G. The end T' of cable T is pulled, e.g. by a winch, whereas the opposite end T' is secured to a balance-beam connecting device 3, the shape of which is more clearly shown in FIG. 18.

Device 3 is secured—at least in the initial stage and in the case of a line of pylons as in FIG. 1—to the guard cable G to be stretched, which is secured centrally on member 3, or to two additional haulage cables T1 and T2 secured at the sides, for the purpose described hereinafter.

Figure 18A:
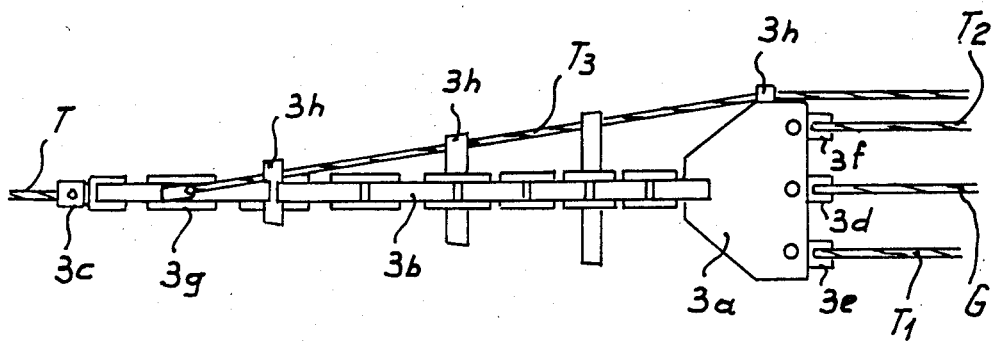
Figure 18B:
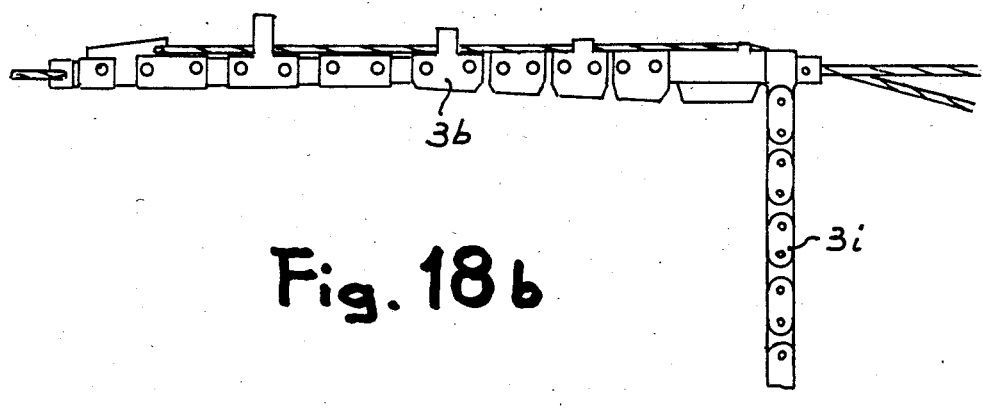

As shown in FIG. 18, member 3 comprises a main attachment plate 3a, one side of which is centrally secured to a chain 3b, all the links of which have a horizontal axis. The free end of chain 3b is secured to the first haulage cable T by a freely rotating attachment 3c.

On the other side of plate 3a thre are three attachments 3d, 3e and 3f, preferably also rotatable, for securing the guard cable G and haulage cable T1 and T2.

Another rotatable attachment 3g is secured to chain 3b and connected to a cable T3 which is deflected to the exterior of plate 3a by stirrups 3h, the function of which will be more clearly explained hereinafter.

Member 3 also comprises a counter-weight 3i secured below plate 3a near the central attachment 3d and comprising a chain having horizontal links.

During the recovery of cable T, counter-weight 3i holds plate 3a substantially horizontally, aided by the fact that the freely rotatable attachments 3c to 3f absorb any torsional stresses applied to the cables. When member 3 moves over pulley 2, cables 3b and 3i hold member 3 in the central position since, owing to the horizontal links, cables 3b and 3i fit into the arcuate groove of the pulley.

As a result, the guard cable G is directly and safely guided over pulley 2, whereas cables T1 and T2 are pulled to the outside and slide over the sides of pulley 2 downwards. FIG. 16a shows the moment when member 3 is moving over pulley 2 and the guard cable G is centred on the pulley whereas cables T1 and T2 are at the sides thereof.

Figure 2:
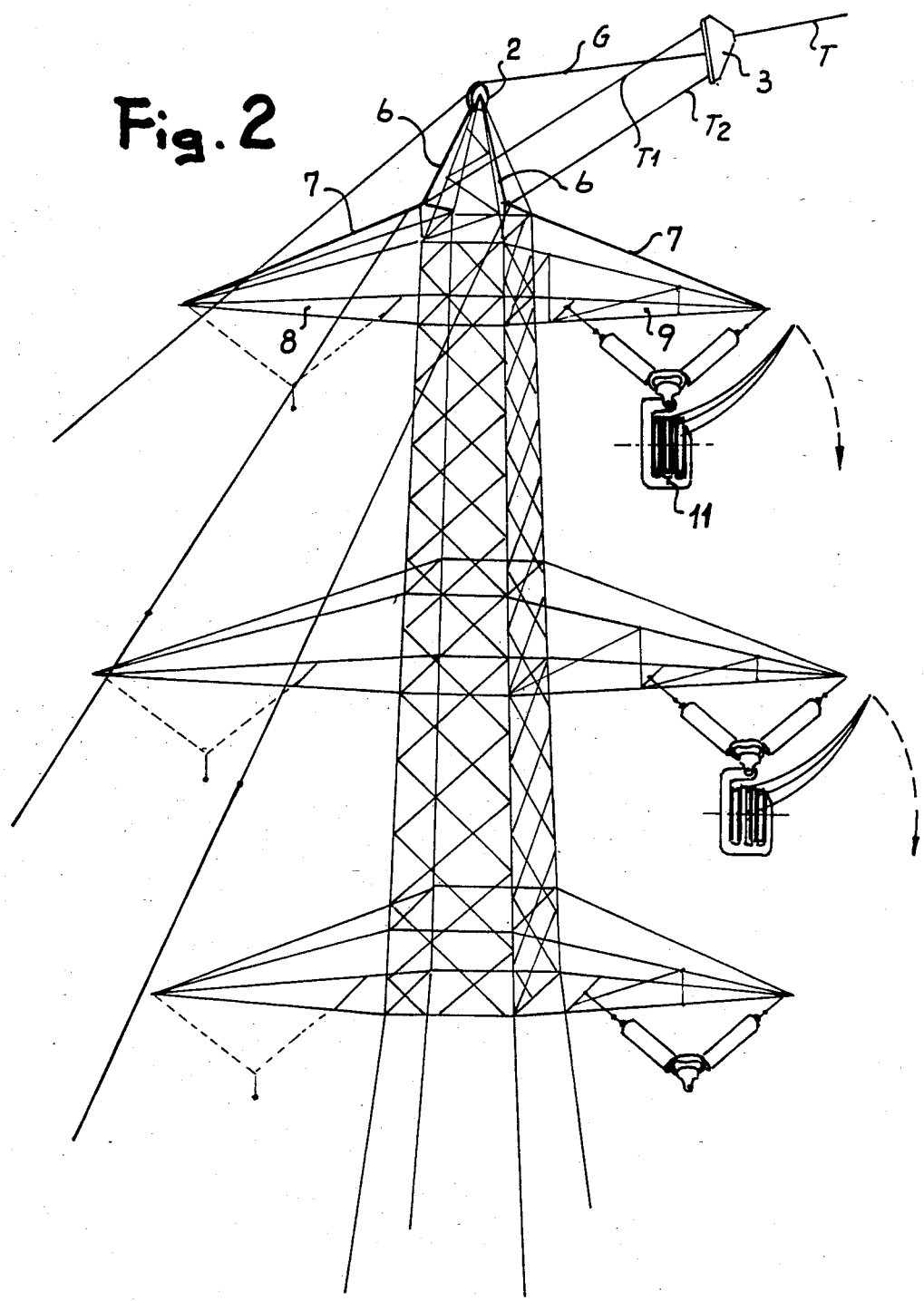

As shown in FIG. 2, in proportion as member 3 moves away from pylon 1 the two cables T1 and T2 move downwards over the sides of the top of the pylon. To facilitate this descent and downward motion and to protect the pylon structure, rods 5 having a pointed tip are secured to the sides of the holder 4 of pulley 2, as shown in FIGS. 16a and 16b. Each rod 5 extends downwards in a tubular guide 6 which, owing to its round cross-section, facilitates the motion of cables T1 and T2 downwards and in the direction in which the cables are pulled.

In an alternative embodiment, guide 6 can be a roller freely rotatable around its longitudinal axis relative to rod 5 and to another holder (not shown) at the opposite end.

As FIG. 2 shows, guides 6 which, as stated, comprise bars or rollers, extend downwards to near the base of the tip of pylon 1, where they are connected to other guides 7 which likewise are inclined downwards but with a gentler slope and extend to above brackets 8 and 9 of pylon 1.

As shown in greater detail in FIGS. 17, guides 7 also comprise tubular elements, more preferably rollers freely rotatable around their respective longitudinal axis and terminating in a round, bevelled rod 7' projecting slightly beyond the end 8' or 9' of bracket 8 or 9.

In an alternative embodiment (not shown) guides 6 and 7 can be replaced by a single straight or curved guide extending from the top rod 5 to the rod 7' at the end of the bracket.

According to yet another variant, the single guide can comprise a steel cable stretched between the topmost part of the pylon and the ends 8' or 9' of the brackets.

The downward motion of cables T1 and T2 is not instantaneous, even if the inclination of guides 6 and 7 is very steep, but progressive, in proportion as member 3 moves away from pylon 1. The reason is that, as long as member 3 is near the pylon, the weight of the haulage cables, which controls the downward motion, is offset by the pull on the cables towards member 3, i.e. towards the central axis of the line.

Figure 3:
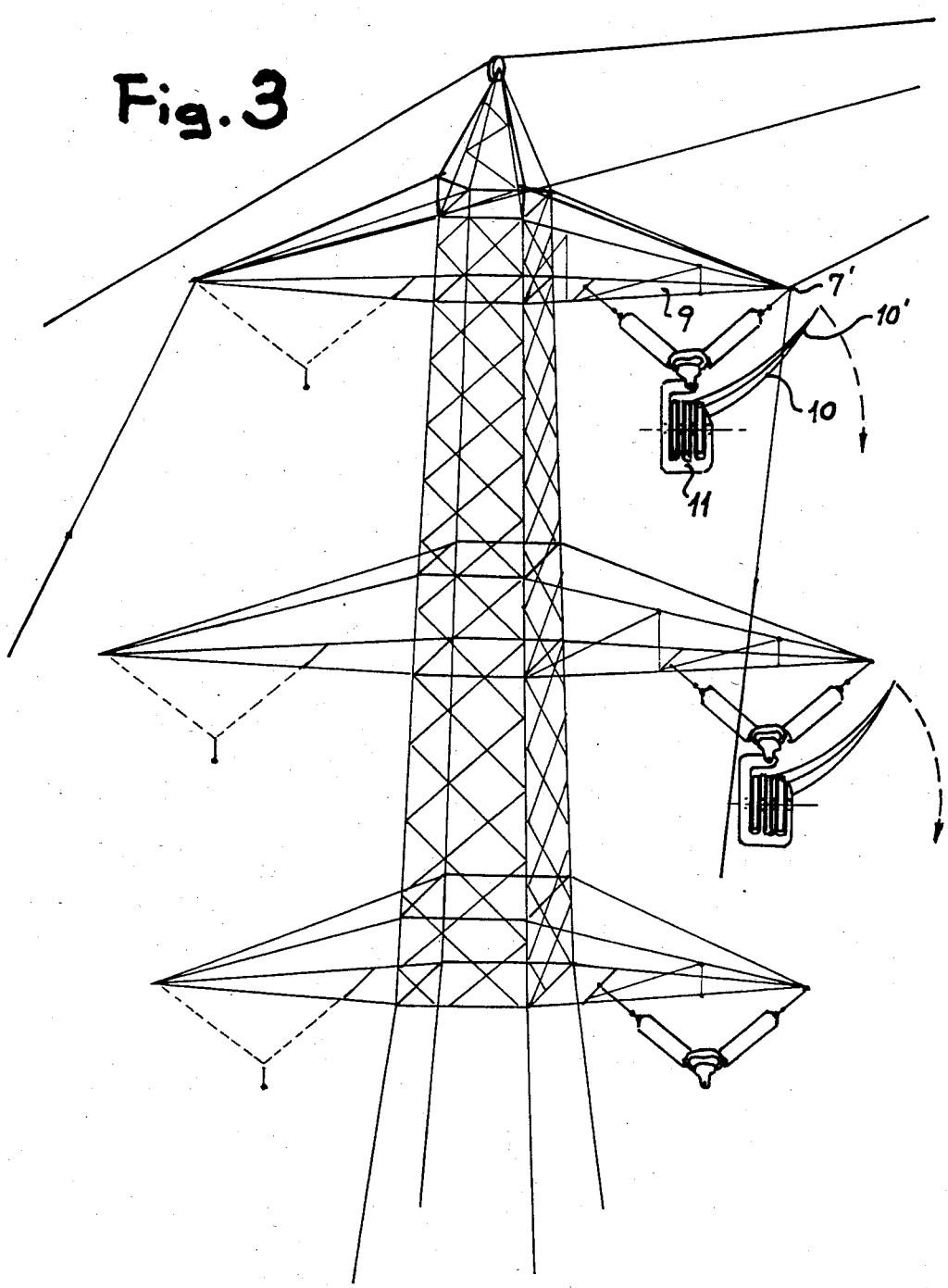

When member 3 moves away, therefore, cables T1 and T2 progressively move downwards until they meet the end rods 7'. This is the position shown in FIG. 3. At this stage the haulage cables fall abruptly down. Note that the fall is not absolutely vertical but inclined towards the axis of pylon 1. This is because each cable is subjected to two opposing forces—on the one hand the resistance of the cable itself and the associated conductor, which acts substantially parallel to the line, and on the other hand the tension which, owing to the relative nearness of member 3 to the pylon, is exerted towards the central axis of the line.

A guide arm or bollard 10 is disposed below the end of the bracket and has a tip 10' projecting beyond rod 7'. When cable T falls, it is collected by arm 10, which is inclined towards the interior and thus guides it towards pulley 11 suspended from the bracket.

Figure 15:
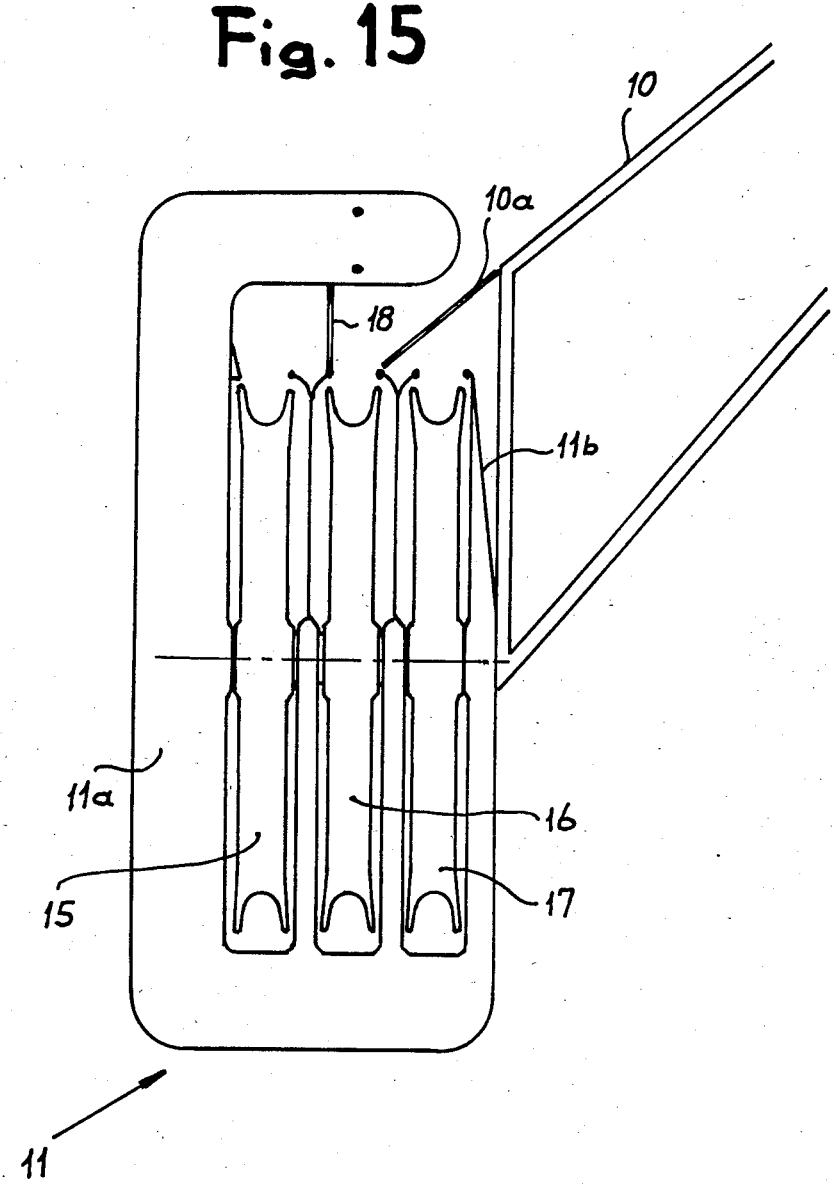
FIG. 15 diagrammatically shows a pulley for use in working the method according to the invention, more particularly for tensioning a bundle of three conductors.

Pulley 11 has an "open" shape, e.g. as illustrated in FIG. 15. As FIG. 15 shows, the pulley frame 11a has a substantially C- or G-shape, i.e. a rectangular structure open at the top of one side. One or more wheels or sheaves are rotatably mounted on the frame in order to convey a conductor or bundle of conductors. In the illustration there are three sheaves 15, 16 and 17.

The central sheave 16 initially conveys the haulage cable, followed by the transmission member 3i each sheave conveying one conductor from the bundle.

As shown in the diagram, arm 10 is shaped so that one end thereof 10a, which prolongs its top edge, terminates at the bottom, under operating conditions, level with the edge of the central sheave 16 as shown. Consequently when the haulage cable, which has fallen from the top bracket, slides along arm 10, it can fit sideways into the frame of pulley 11 and be directly positioned in the groove of the central sheave 16. A stop arm 18 prevents the cable from sliding beyond sheave 16 towards sheave 15.

Figure 4:
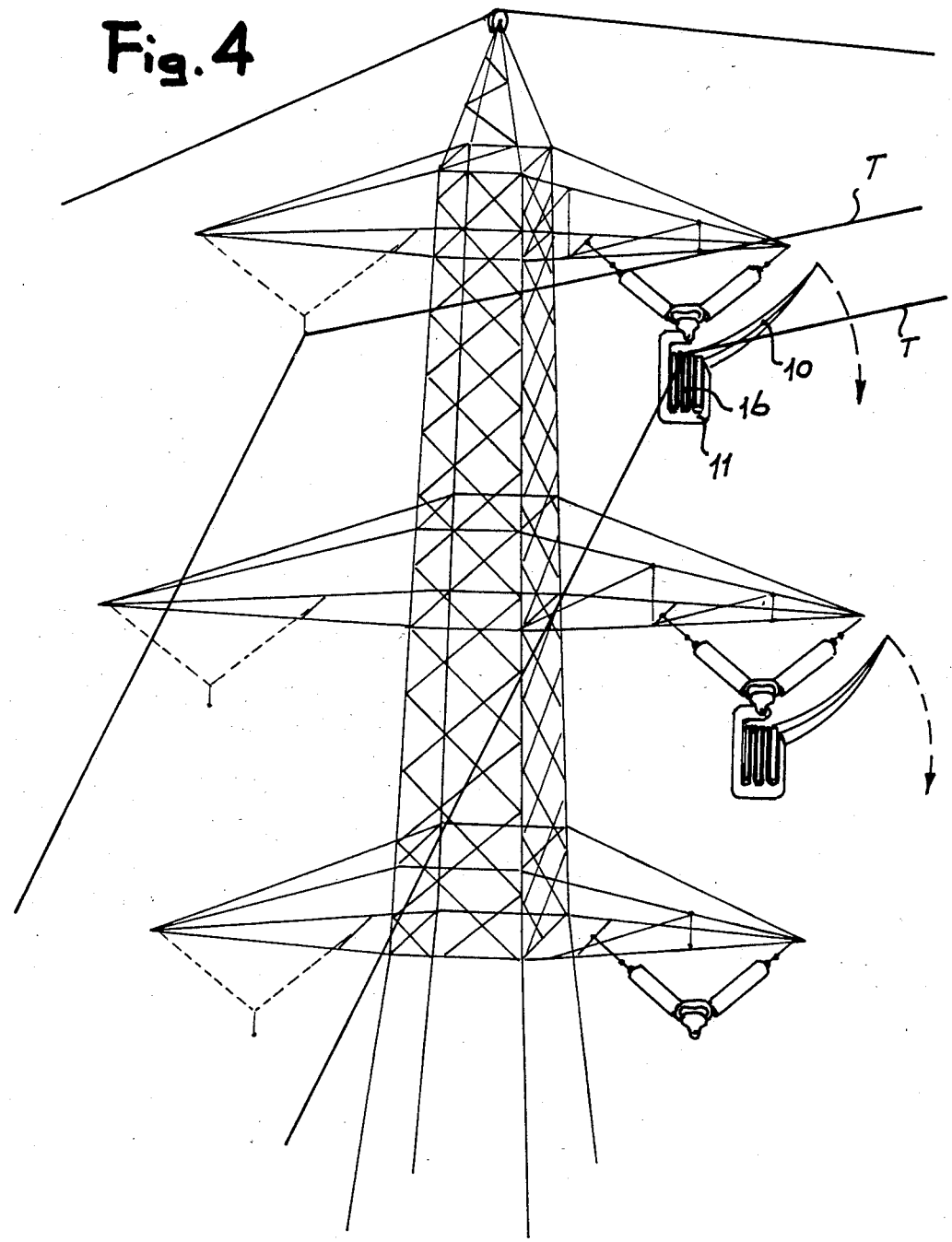

FIG. 4 shows the final or arrival position of the haulage cable when it is properly positioned and centered on the pulley 11 of the top bracket in the pylon.

Figure 5:
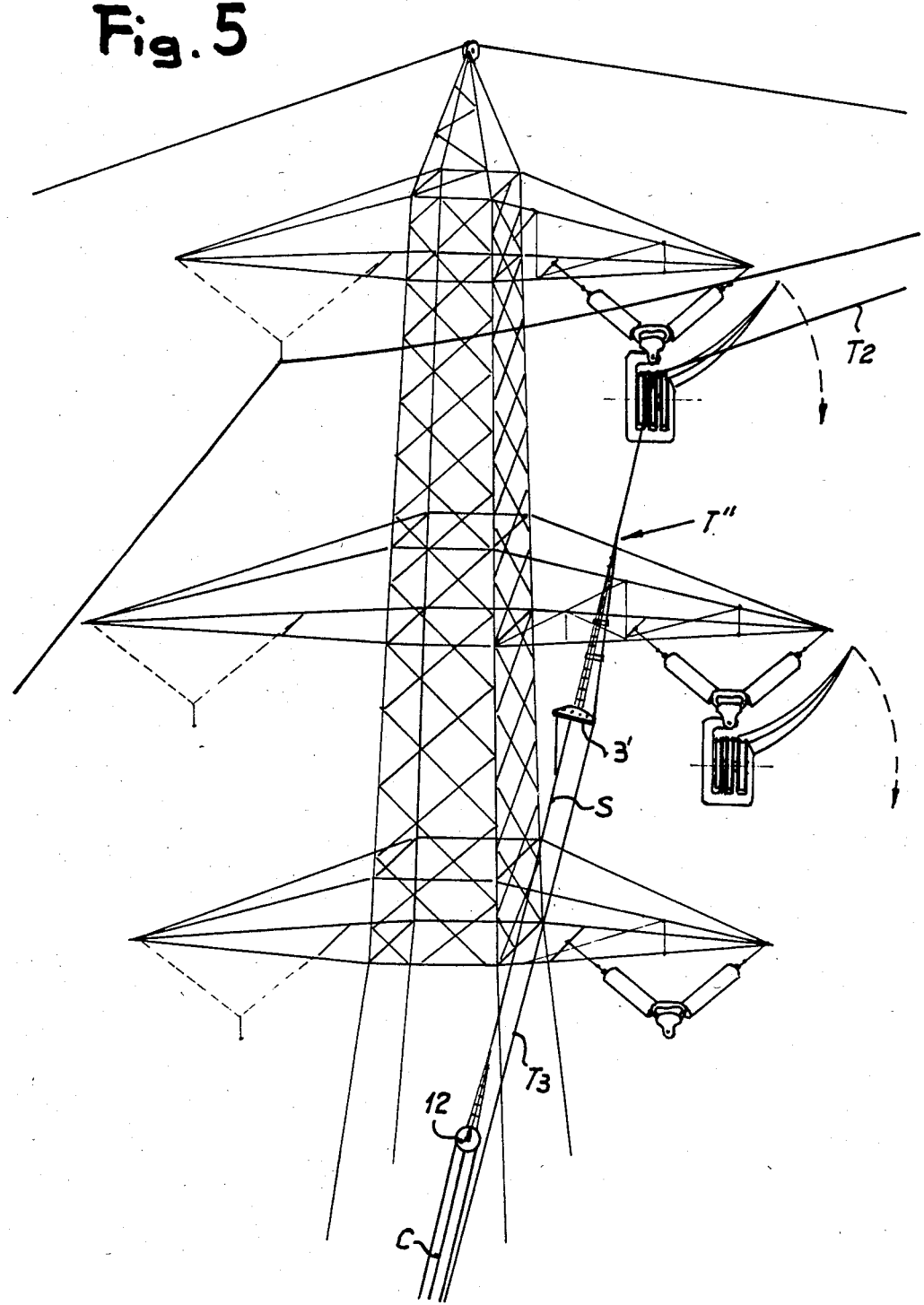
FIGS. 5 to 7 show the same pylon during four successive operating stages showing the tensioning of the haulage cables and bundles of conductors underneath.

The next stage of operation is shown in FIG. 5, which shows that the end T" of the cable is coupled to a balance-rod member 3 which is coupled to the following:

in the central position of member 3 a service cord S (FIG. 18a) is coupled by attachment 3d, the other end of which is connected to a conventional transmission member 12 for a bundle of three conductors C.

in the lateral position of member 3 another haulage cable T3 is coupled, which is secured to the attachment 3g of member 3 shown in FIG. 18a and is guided over the ends of stirrups 3h.

Figure 6:
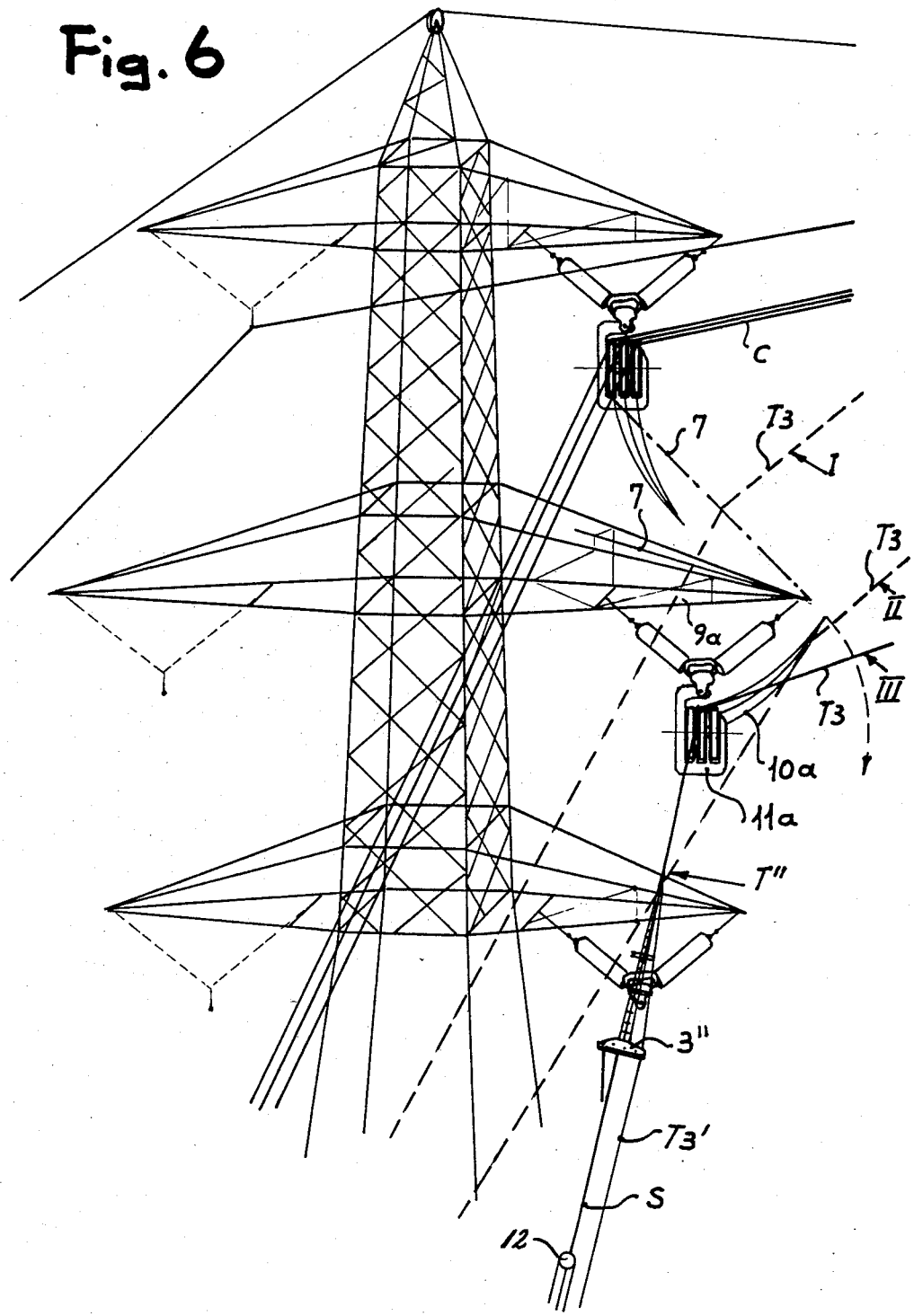

Before member 3 reaches the pulley, arm 10, which is swivally mounted in a suitable manner known to those of ordinary skill in the art, is tilted downwards, e.g. into the position shown in FIG. 6.

As shown in FIG. 5, when member 3 reaches the pulley, cord S will take place of the haulage cable T2 on the central sheave 16. At the same time, cable T3 is drawn beyond the outermost sheave of pulley 11 and, owing to the absence of arm 10 which has been tilted downwards, runs along the side 11b and falls freely downwards.

As shown in FIG. 6, during the pulling of the bundle of conductors C, each positioned on a sheave 15, 16, 17 of pulley 11, the cable T3 is falling towards the bracket 9a underneath and bears on a guide 7. Guide 7 is secured to bracket 9a in a manner completely similar to the guide 7 associated with the top brackets 8,9. Alternatively, guide 7 can be mounted so as to slide between the end of the bracket underneath and the base of the pulley, as shown by a chain-dotted line in FIG. 6, in which case guide 7 can also stabilize the pulley. In both cases, the cable falls and abuts the guide underneath owing to the face that the bracket 9a projects externally beyond the vertical axis of the pulley 11 underneath.

FIG. 6, accordingly, shows the bundle of three conductors C, which now rest in the pulley 11 of the uppermost bracket, after the transmission member 12 and haulage cable T3 have passed over pulley 11 in three successive positions as follows:

Position I on guide 7 (indicated by a broken line), which cable T3 assumes immediately after it has passed over the highest pulley 11;

Position II (indicated by a broken line), which cable T3 takes up after sliding along guide 7 and falling below bracket 9a against arm 10;

Position III (indicated by a continuous line), which cable T3 assumes after sliding along arm 10a and entering pulley 11a.

During the pulling of the bunch of conductors C over the highest pulley 11, cable T3 is also pulled over the pulley 11a underneath. At the moment when member 3" reaches pulley 11a, the bundle of conductors C and cable T3 have been completely extended. At this point, pulling begins on cable T3' which is associated with another balance-beam member and another bundle of conductors. FIG. 6 shows member 3 arriving near pulley 11a and anchored to the haulage pulley, which is coupled to a service member S for pulling a transmission member 12 (not shown) for another bundle of conductors and another haulage cable T3' secured to attachment 3g.

Figure 7:
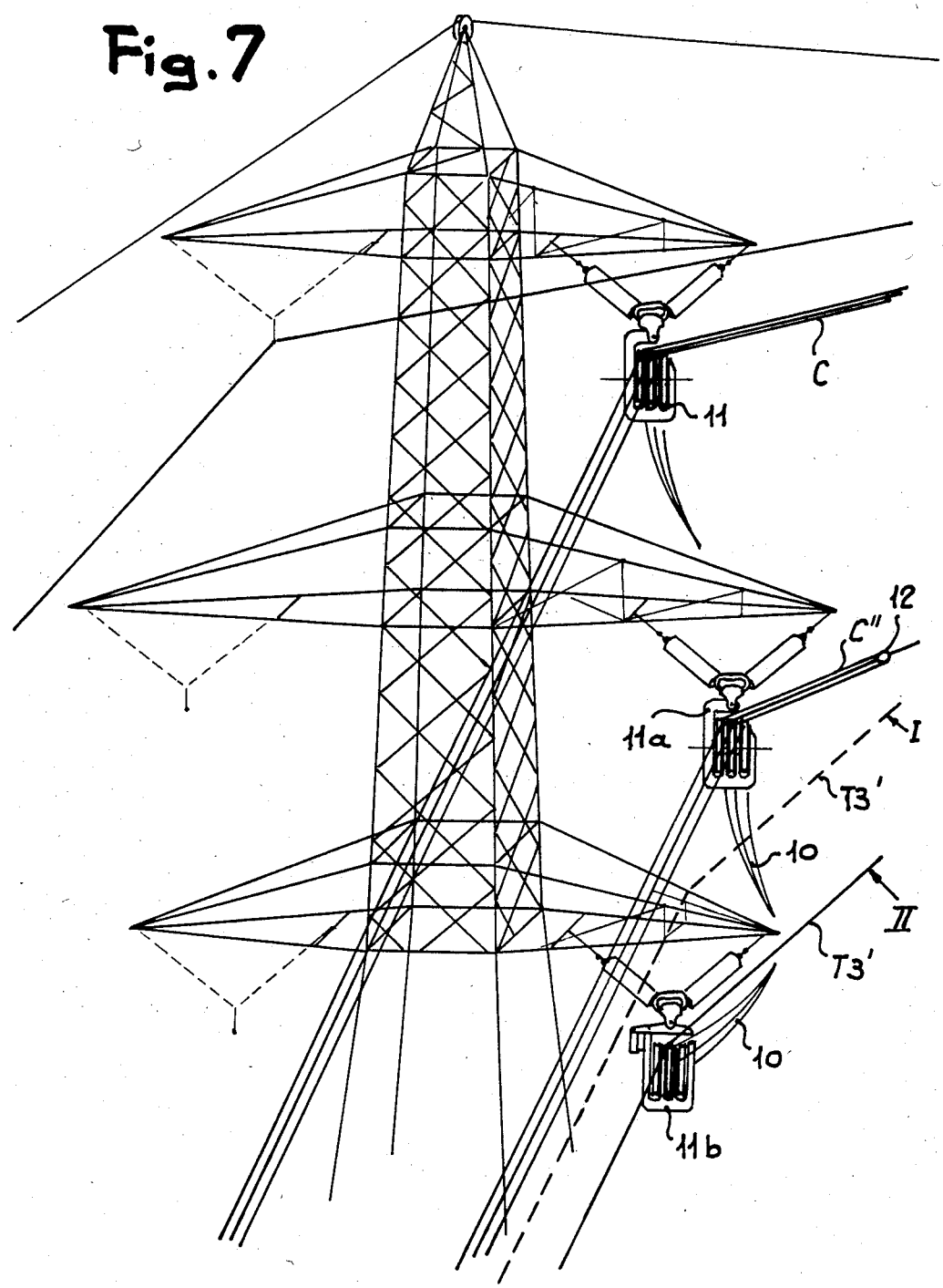

Finally, FIG. 7 shows the stage when the bundle of conductors C have been completely drawn over the highest pulley 11 and the bunch of conductors C', member 3 and transmission member 12 are beginning to pass over the pulley 11a underneath, having just passed the previous pulley. At the moment when member 3 passes pulley 11a, cable T3' slides and falls and takes up position on the lowest pulley 11b. As before, the fall is shown in various stages, i.e.:

position I in which cable T3' after sliding from pulley 11a, has fallen and abuts the guide 7 of the lowest bracket, and position II, in which the cable rests on the lowest pulley 11b.

Cable T3' is adapted next to draw a bundle of conductors like the preceding ones, but of course it is not necessary to draw other haulage cables at the same time.

All the stages described hereinbefore with reference to FIGS. 4 to 7, which show the positioning and pulling of the haulage cables and conductors on the right side of the pylon relatively to the drawing, are exactly similar for the left side, either subsequently or simultaneously depending on the chosen operating conditions.

During the aforementioned stages reference has always been made to the motion of a balance-beam member 3, directly drawn by the haulage cable. The last-mentioned cable is pulled while cord S pulls transmission member 12 and the bundle of conductors. This method is appropriate when it is desired to prevent a haulage cable travelling side by side with the conductors; in such cases cord S will be longer or at least equal in length to the length of cable between two pylons, so that the additional haulage cable is moved, and consequently moved away from cord S, opposite a given pylon along the line, before transmission member 12 has passed the preceding pylon.

Alternatively, if the preceding requirements does not apply, member 3 can be connected to the haulage cable and also directly connected to the bunch of conductors (via the rotary attachments 3d, 3e and 3f) and to the additional haulage cable (via attachment 3g), thus avoiding the use of transmission member 12.

Figure 8:
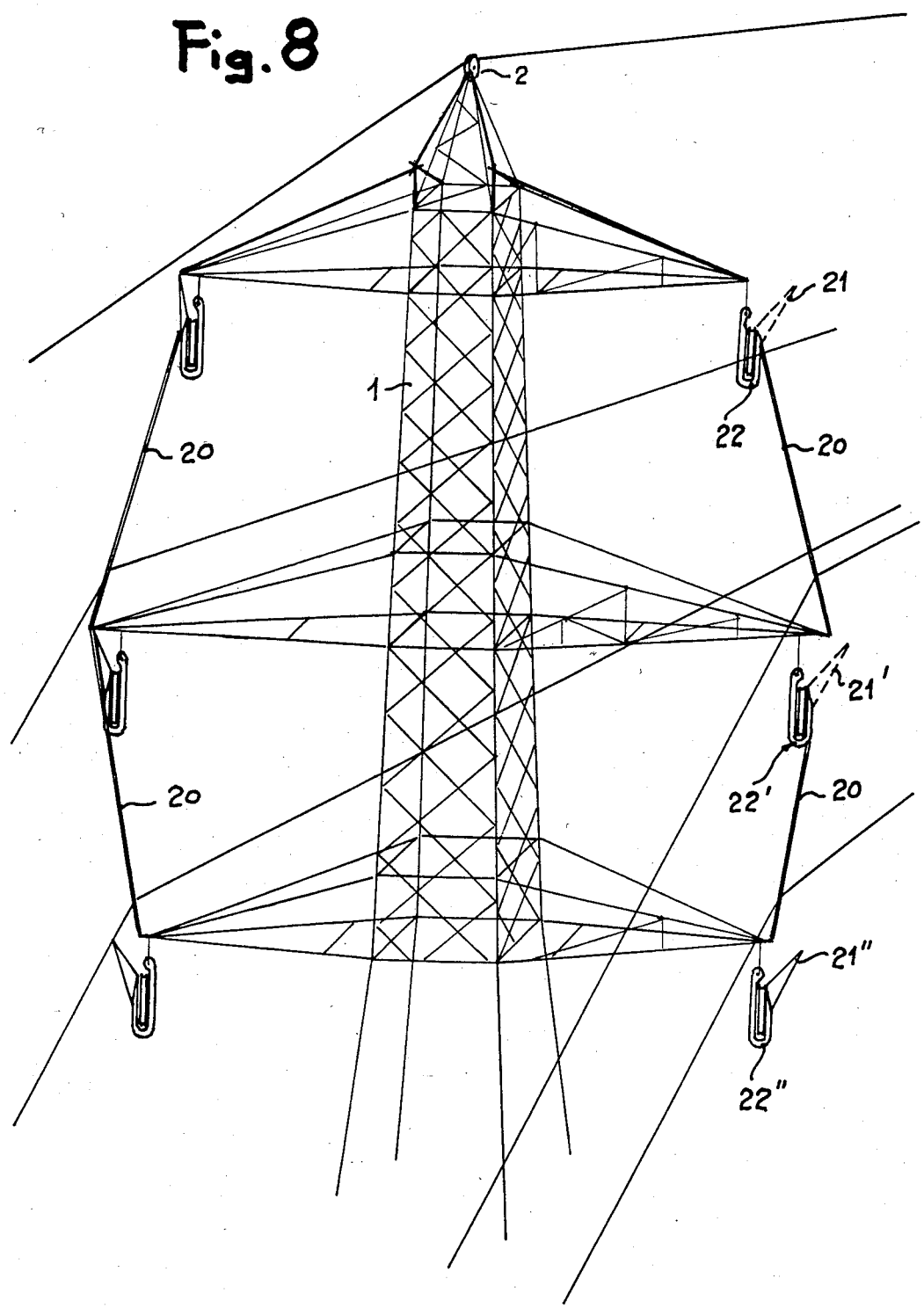
FIG. 8 shows the same pylon with seven brackets, fitted up in accordance with a variant of the system according to the invention.

FIG. 8 shows a different embodiment in which single conductors are stretched on a pylon of the same kind as shown in the preceding drawings.

In FIG. 8, the pylon is fitted with rods 20 and cables extending between each pulley 22 and the end of the bracket underneath it. Each pulley 22 is associated with a bollard or arm 21 which can take either a closed position (as shown on the left side of the pylon relative to the drawing) in which case motion will occur between pulley 22 and the end of the supporting bracket, or an open position (shown at the right of the pylon) when the cable or conductor will be guided inside the pulley.

The system shown in FIG. 8 can be used for stretching in various ways, some of which will be shown hereinafter. All of them start from an initial preliminary stage in which a pilot cord or haulage cable is positioned on the top pulleys 2 by the conventional method, by hand or by a helicopter.

(A)—The first haulage cable is used to draw three additional haulage cables as already shown in the case of cables T1, T2 and G during the first stage of the process illustrated in FIG. 1. The central additional haulage cable remains on pulley 2, whereas the side haulage cables are pulled and slide along the top and the first brackets, arms 21 and 21' of the top pulleys 22 and 22' being closed, so that the cables travel over pulleys 22, descend along the first rods 20, travel over the second pulleys 22' descend along the lower rods 20, and finally fall beyond the lowest bracket on to the arm 21" underneath and into pulley 22". During the motion of the cable, the bottom arms 21' open, whereas arms 21 remain closed. The cable remains on pulleys 22 and the pull begins on three other haulage cables. In the same manner as shown previously, the central cable remains on pulleys 2 whereas the two side cables are run and slid downwards. They travel over the top pulleys 22, down the top rods 20 and, after travelling over the tip of the intermediate bracket, enter arm 21', which is now open, and are guided into the intermediate pulleys 22". During this second motion of the cables, the top arms 21' also open and, while the cable remains on pulleys 2, the pulley begins on the guard cable and two further haulage cables. The guard cable remains positioned on pulleys 2, in order subsequentary to be secured at the top of the pylon, whereas the two supplementary cables are moved and slide along the top brackets on to the open arms 21 and are guided into the top brackets 22. When the haulage cables are positioned in each bracket, the conductors are tensioned in the usual manner.

Of course, instead of pulling six complete haulage cables in the described manner, service cords can be used for the drawing operations and directly coupled to the conductors.

(B)—As an alternative to (A), five haulage cables instead of three can be drawn during the first operation. The central cable is positioned on pulleys 2 whereas the other cables are conveyed, two on the left and two on the right of the pylon, and are guided in the previouslydescribed manner over the intermediate pulleys 22' and bottom pulleys 22", arm 21' being opened immediately after the first of each pair of cables travels over it. Next, the cable which has remained on pulleys 2 is used to pull the guard cable and the two cables to be positioned on the top pulleys 22. Preferably the first five haulage cables are drawn by two balance-beam members in succession: a first balance member drawing two haulage cables and a central service cord of reduced length, and a second balance member coupled to the service cord and pulling the other three haulage cables. This facilitates the drawing process and prevents two cables from sliding together over the same bracket and twisting.

(C)—If a sufficiently powerful winch is available, another alternative consists in drawing six haulage cables and the guard cable simultaneously; the central guard cable is positioned on pulleys 2 whereas the haulage cables are drawn three to the right and three to the left of the pylon. In order properly to position the cables on pulleys 22, 22' and 22", the top arm 21 is opened immediately after two of the cables have run over it, whereas arm 21' is opened immediately after one cable has run over it.

In this case also it is preferable to use three balance members in rapid succession one after the other, as already explained in alternative B).

(D)—Alternative methods can be used, as chosen by the skilled in the art, for simultaneously pulling five haulage cables and conductors. These other methods, if any, will of course be decided upon in accordance with the operating conditions and the available means, without modifying the essential features of the invention.

The aforementioned methods of tensioning single conductors can of course also be used for tensioning bundles of conductors. More particularly, instead of proceeding in the method indicated in FIGS. 1 to 7, all six haulage cables can be positioned first, e.g. by one of the methods (A) to (D) hereinbefore, after which each haulage cable can be used to tension a respective bundle of conductors in conventional manner in the preferred sequences.

Figure 9:
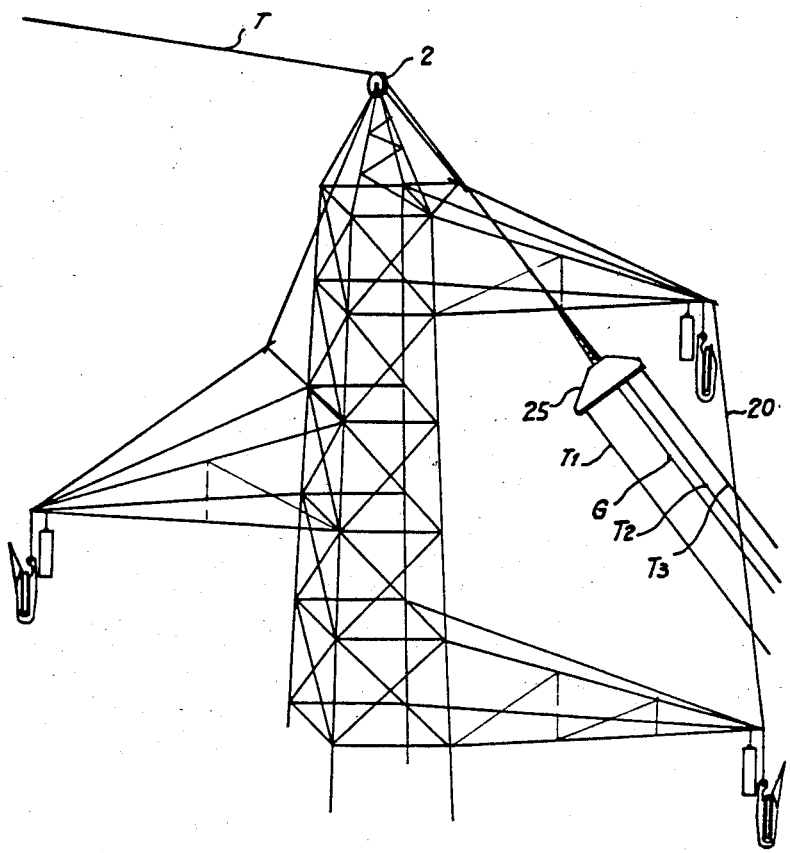
FIGS. 9 to 11 show three successive steps in tensioning on a pylon with three brackets distributed at three different levels in an asymmetrical arrangement.
Figure 10:
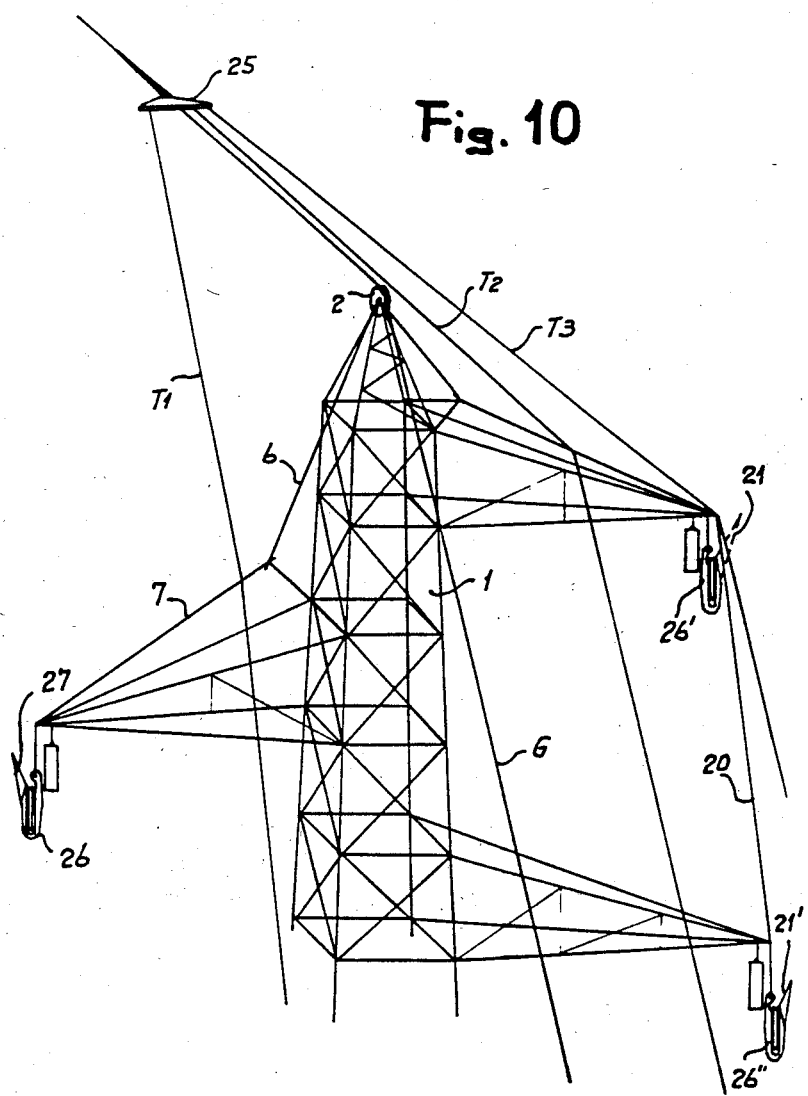
Figure 11:
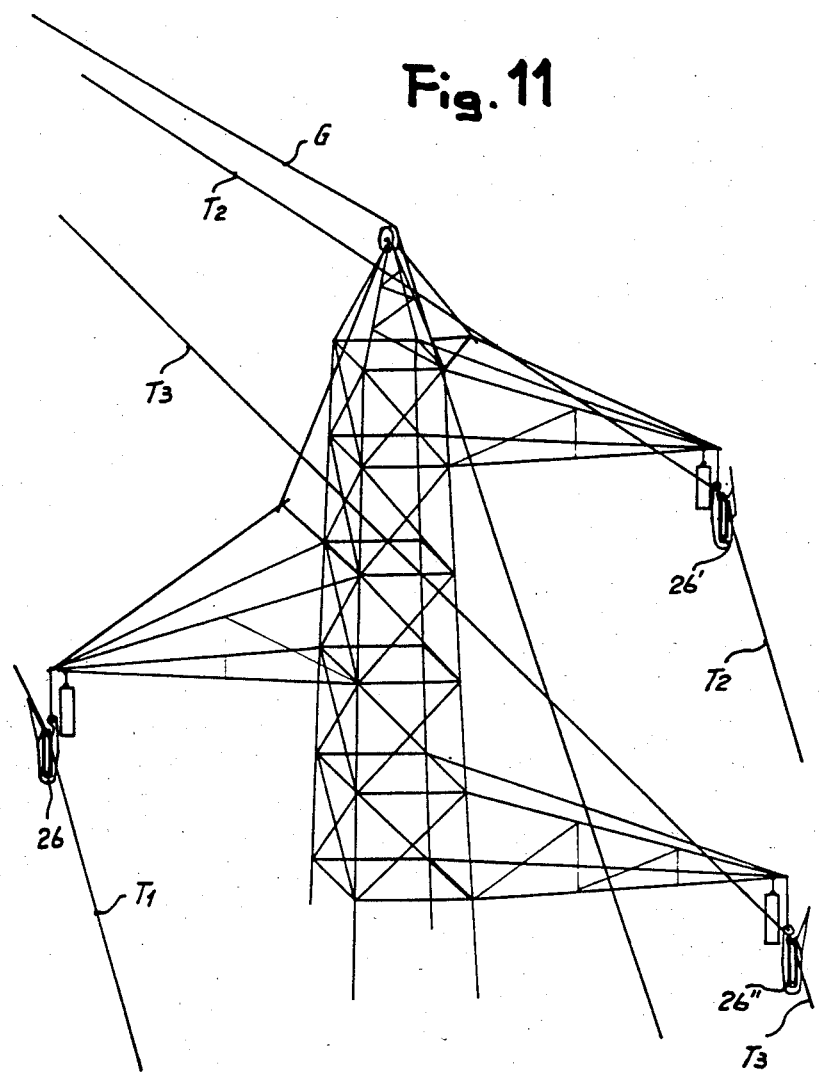

FIGS. 9 to 11 show the sequence of operations according to the invention for tensioning on an asymmetrical pylon having three brackets.

As shown in FIG. 9, a pilot cord is positioned in conventional manner, i.e. manually or by helicopter, on the top pulleys 2 and is replaced by a first cable T, which is used to pull the guard rope G and three additional haulage cables T1, T2 and T3. The pull is applied via an asymmetrical balance member 25 diagrammatically shown in FIG. 9.

FIG. 10 shows the balance member 25 when it has just passed the top pulley 2. The guard cable G is thus positioned in the groove of pulley 2 in the previously-described manner. The three haulage cables are drawn one on one side and two on the other side of pylon 1.

Cable T1, which is drawn to the left of the pylon, descends along guides 6 and 7 until it reaches the end of the left bracket, from which it falls, guided by arm 27, into pulley 26.

Cables T2 and T3 descend along guides 6, 7 borne by the top right bracket to the end threof, where a pulley 26' is secured with a closed arm 21 and a rod 20 completely similar to that illustrated in FIG. 8 is secured between pulley 26' and the bracket underneath. As soon as cable T3 has moved over the top bracket and arm 21 and pulley 26', arm 21 opens. Thus, whereas cable T3 slides down along rod 20 to fall on to the open arm 21' and be guided into pulley 26", cable T2 falls into arm 21, which is now open, and is guided into pulley 26".

FIG. 11 shows the final position in which cables T1, T2 and T3 have been finally positioned in the respective pulleys 26, 26' and 26" and are ready to pull single conductors or bunches of conductors as required.

Of course, as already stated, instead of stretching haulage cables over the entire length of the line and then using them to stretch the conductors, the balance member 25 can be attached to service cables which are directly attached to conductors or bundles of conductors, the service cables performing the function of moving until they rest in the pulleys underneath.

As already stated it may be preferable, instead of attaching all three cables and the guard cable to the same balance member 25, to use a first balance member attached to cables T1 and T2 and a short central cable, which is attached to a second balance member for drawing the guard cable G and cable T2.

Figure 12:
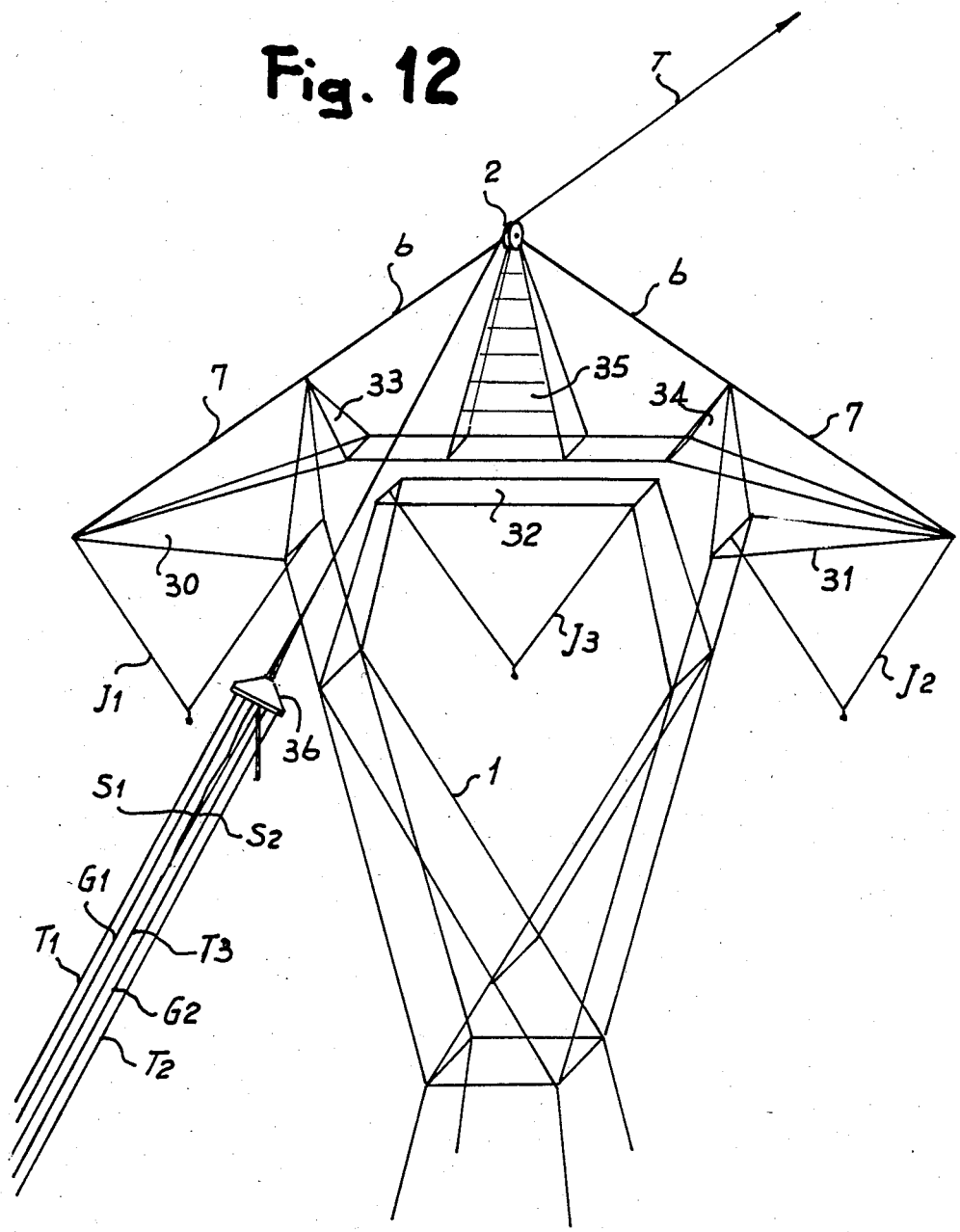
FIGS. 12 to 14 show three successive steps in tensioning on a Y-type pylon.
Figure 14:
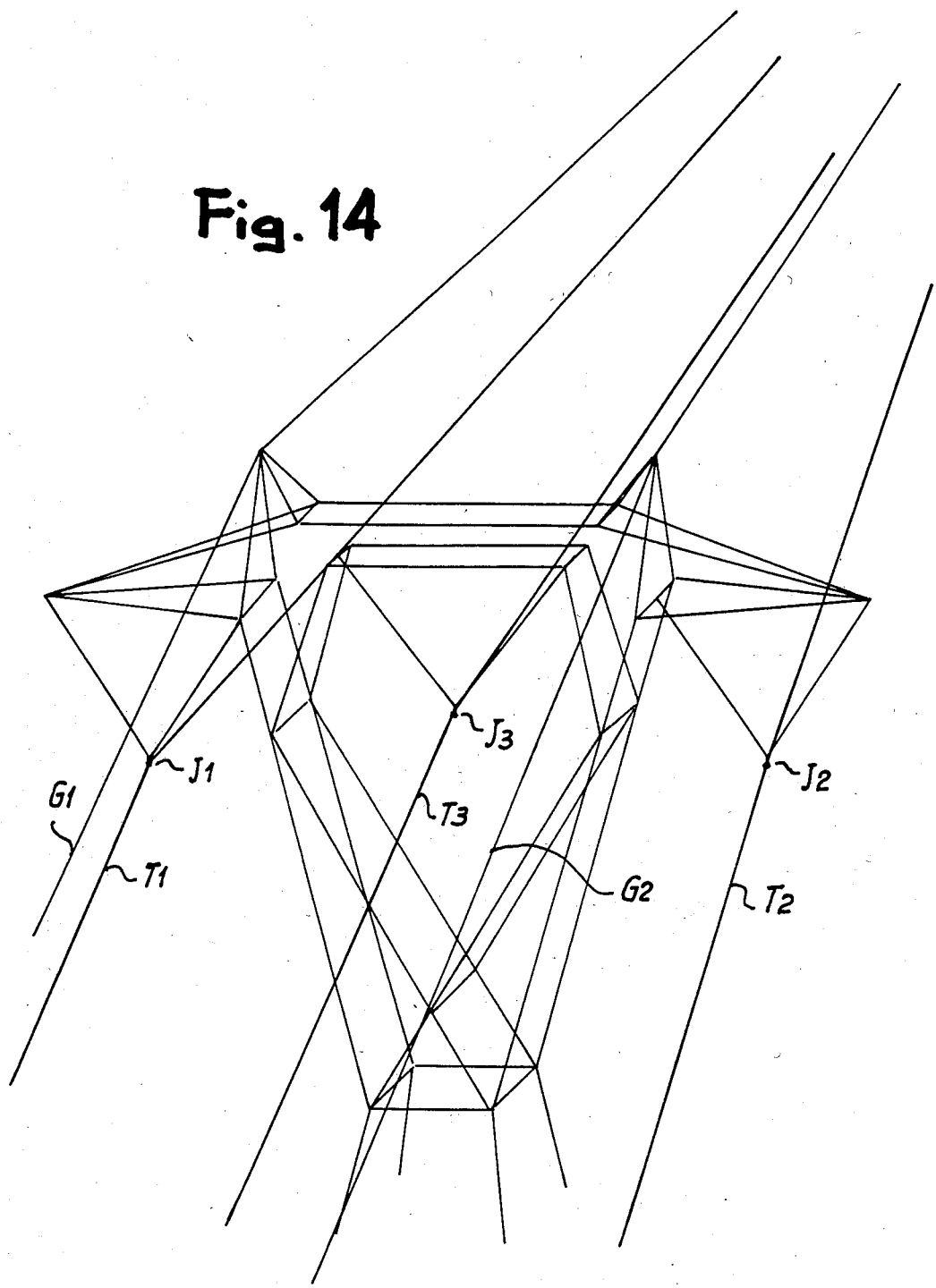

FIGS. 12 and 14 show the sequence of operations according to the invention for drawing over a Y-type pylon. As is known, in a pylon of this kind the conductors are suspended from insulators J1, J2, J3 borne by two side brackets 30, 31 and a central cross-member 32. The pylon also has two small tips 33, 34 each bearing a guard cable. According to the invention, an additional central tip 35 is positioned on the aforementioned known pylon and used exclusively for the system of tensioning according to the invention, and is therefore preferably dismantled ater the tensioning operation has been completed.

Apex 35 bears the previously-described top pulleys 2 and is also secured to guides 6, which preferably run from pulley 2 to the top of apices 33 and 34, and guides 7, which run from apices 33, 34 to the outer ends of brackets 30, 31 respectively.

Tensioning is performed as follows:
the first haulage cable is positioned on pulley 2 in the conventional manner as previously mentioned and is used to pull a balance member 36 secured to two guard cables G1, G2 and three haulage cables T1, T2 and T3.

FIG. 12 shows member 36 approaching pylon 1. FIG. 12 also shows how, according to an important feature of the invention, the central cable T3 is not pulled directly by member 36 but by a pair of service cables S1, S2 connected by joints which can easily be dismantled, and the purpose of which will be described in detail hereinafter.

One service cable—cable S1 in the present case—is under tension, whereas the other is slack. Consequently, when member 36 travels over the pulley, only cable S1 remains on it, whereas (FIG. 13) guard cable G1 and haulage cable T1 are slid towards the centre of the pylon, guard cable G2 and haulage cable T2 are slid towards the right of the pylon (relative to the drawing in all cases), whereas cable S2 can be slid either from the right or the left of pulley 2.

Figure 13:
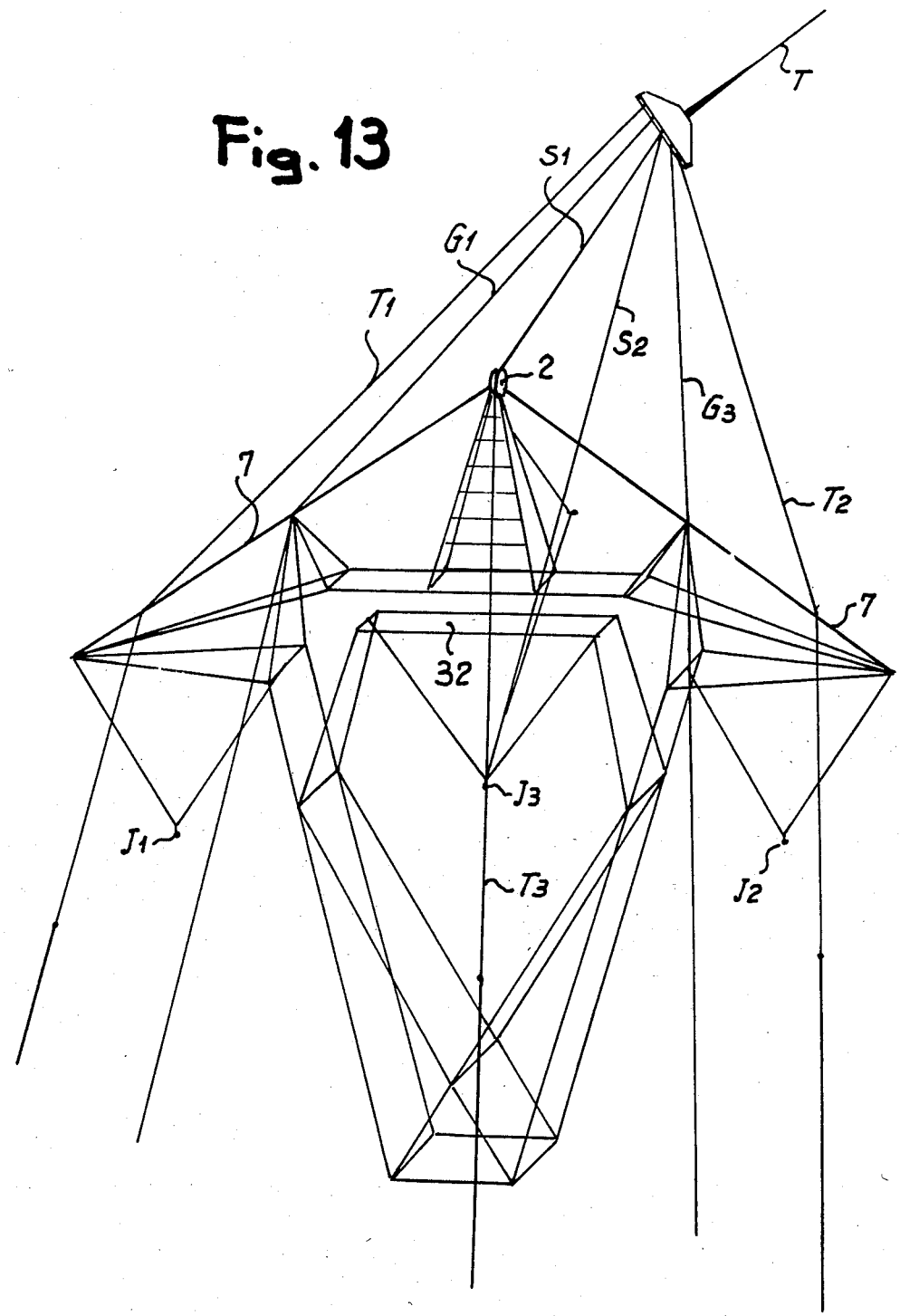

As soon as member 36 has passed pulley 2, the pull is temporarily stopped. An operator disconnects the slack cable S2 and conveys it below cross-member 32 and then re-secures it. The operator also, using special equipment, tensions cable S2 and cosequently relaxes S1. FIG. 13 shows this exact moment, when cable S2 has just been re-attached and tensioned. Immediately afterwards, the operator releases cable S1, now' slack, and conveys it under member 32 and reattaches it, at which point the pull can recommence.

As FIG. 13 also shows, cables T1 and T2 have been slid along guides 6 and after opening two small arms (not shown) at the top of apices 33, 34, bear against guides 7 above brackets 30 and 31; guard cables G1 and G2 have been slid along guides 6 and, since the arms are open, have taken up position on pulleys (not shown) at the top of apices 33 and 34.

Finally FIG. 14 shows how, when member 36 moves further away from the pylon, haulage cables T1 and T2 slide along guides 7 and fall from brackets 30, 31 and are guided in the previously-described manner over arms (not shown) under the ends of the brackets, which guide them into corresponding pulleys (also not shown). FIG. 14 shows this final configuration, in which haulage cables T1, T2 are disposed in pulleys suspended from insulators J1 and J2, the central haulage cable T3 is disposed in a pulley suspended from insulator J3 and the guard cables G1, G2 are disposed in pulleys (like the preceding, not shown) at the top of apices 33 and 34. As FIG. 14 also shows, the central apex 35 has been dismantled, since it is no longer necessary.

In this case also, instead of attaching the three haulage cables and the two guard cables to a single balance member 36, it may be preferable to use a first balance member to pull the two outer cables T1 and T2 and a central cable, which is attached to a second balance member for pulling the two guard cables and the central haulage cable T3.

Throughout the description, reference has been made to the initial positioning of a pilot cord by conventional methods, i.e. by hand or by helicopter, and used firstly to pull a haulage rope. This manner of expression is based on the usual technique, in which the pilot cord is a light cable of synthetic material such as nylon, which makes it easier to position, whereas the haulage cable is normally of steel and relatively heavy, and more particularly capable of withstanding considerable tension and not accumulating torques. Of course it is possible, and is actually practiced, for the cable initially positioned on the top pulleys to be capable of directly pulling the conductors.

More particularly in the last case, but of course also in the more general case where a pilot cord is used followed by a haulage cable, the balance members used for pulling will first be secured to the service cables, which will be adapted for sliding and moving from the top pulleys to the bottom pulleys, to which the conductors or bundles of conductors or haulage cables will subsequently be attached.

The advantges of the method according to the invention are considerable In addition to the previously-mentioned main advantages of rapid performance, particularly on difficult or irregualr routes, and of protecting the vegetation underneath, there is also a considerable reduction in the need for pilot cord, the power lines remain out of operation for only a short time, and owing to its low expense, as previously mentioned, the method of controlled tensioning can be extended to less important lines, e.g. 150 kV. Other advantages can easily be seen by the skilled in the art.

However, the invention is to limited to the particular embodiments or procedures described, or to the only specific use which has been disclosed, but can have many variants, including uses, e.g. of stretching relpher cables or the like, which are all within reach of a technician skilled in the art, and therefore are all falling within the protection scope of the present invention.

I claim:

1. A method for stringing high-tension electric power lines on a set of pylons, comprising the steps of:
    mounting a first pulley generally on the top of each pylon;
    mounting at least a second set of pulleys on pylon brackets beneath the first pulley on each pylon;
    mounting guide means on said second set of pulleys;
    mounting fixed guide means on each of said pylons;
    disposing a first cable on each of the first pulleys;
    attaching said first cable to a first balanced connecting member carrying at least second and third cables;
    drawing said first cable past said first pulleys; and
    drawing the first balanced connecting member over the first pulleys while concurrently guiding at least one of said second and third cables generally downwardly along the fixed guide means onto the guide means and into one of the second set of pulleys.

2. A method as claimed in claim 1, and further comprising the steps of:
    attaching a second balanced connecting member carrying at least one conductor and a fourth cable to one of said second and third cables positioned on said one of said second set of pulleys;
    drawing said one of said second and third cables past said one of the second set of pulleys so that said at least one conductor rests in said one of the second set of pulleys and said fourth cable slides generally downwardly to a third pulley beneath said one of the second set of pulleys.

3. A method as set forth in claim 1, wherein said first balanced connecting member has first and second outer cables secured thereto and a guard cable arranged centrally therebetween so that when said first balanced connecting member is drawn past said first pulley on one pylon, said first and second outer calbes slide downwardly on opposite sides of said one pylon to respective ones of said second set of pulleys, said guard cable remaining on said first pulley.

4. A method as set forth in claim 1 and further comprising the steps of:
    attaching a second balanced connecting member carrying at least a fourth cable and at least one service cord to one of said second and third cables;
    said service cord being arranged between said second balanced connecting member and a transmission member;
    coupling said transmission member to at least one conductor; and
    drawing said second balanced connecting member past said second set of pulleys, said service cord and the at least one conductor remaining on said second set of pulleys and said fourth cable sliding generally downwardly to a third set of pulleys arranged beneath said second set of pulleys.

5. A method as set forth in claim 2, and further comprising the step of:
    coupling a first end of a portion of service cord to at least one of the first and second balanced connecting members, said portion of service cord having a short length sufficient to complete the sliding along both the fixed guide means and the guide means on said second set of pulleys, a second end of said service cord being connected to at least one conductor.

6. A method as set forth in claim 2, and further comprising the step of:
    moving said guide means on said second set of pulleys to an open position after said one of said second and third cables is arranged on said one of the second set of pulleys so that said fourth cable is permitted to move downwardly toward the third pulley beneath said one of the second set of pulleys.

7. A method as set forth in claim 1, wherein one of said at least second and third cables is a guard cable, and further comprising
    pulling said first balanced connecting member past said first pulleys such that the guard cable rests on said first pulleys and the other of said second and third cables slides generally downwardly onto said one of said second set of pulleys.

8. A method as set forth in claim 1, further comprising the steps of:
    asymmetrically connecting four cables to said first balanced connecting member;
    positioning said four cables with one cable secured along a central axis of the connecting member and two cables secured to one side of said central axis and one cable secured on the other side of said central axis, after passing said first cable said one cable moving downwardly on one side of the pylon to one of said second set of pulleys and said two cables moving downwardly on the other side of the pylon progressively to third and fourth pulleys arranged sequentially vertically beneath said first pulley.

9. An apparatus for stringing high-tension electric power lines on a set of pylons, comprising:
   first pulley means mounted generally on a top of each pylon for receiving a first cable, a balanced connecting member attached to said first cable and carrying at least second and third cables;
   fixed guide means mounted on each of said pylons for guiding cables generally downwardly from said first pulley means;
   second set of pulley means on each pylon suspended on brackets beneath said first pulley means on each pylon for receiving at least one of said second and third cables;
   each of said pulley means of said second set including at least one freely rotatable sheave and guide means mounted thereon for directing one of said at least second and third cables onto a respective one of said second set of pulley means.

10. An apparatus as in claim 9, wherein a frame of each pulley means of said second set has the shape of a rectangle inside elevation with an opening in one side of the rectangle.

11. An apparatus as set forth in claim 9, wherein said guide means on each pulley means of said second set of pulley means comprises swivel mounted guide means, said swivel mounted guide means having sloping arms for guiding one of said at least second and third cables onto said pulley means.

12. An apparatus as set forth in claim 9, wherein said guide means on each pulley means of said second set of pulley means is arranged to be moved to a position to permit a fourth cable connected to a second balanced connecting arrangement attached to one of said at least second and third cables to move into third pulley means arranged beneath said second set of pulley means.

13. An apparatus as set forth in claim 9, wherein each of said fixed guide means is attached to a base of a respective one of the pulley means of the second set of pulley means and to a bracket on the pylon beneath the base of the respective pulley means.

14. An apparatus as set forth in claim 13, where each of said guide means includes a tubular member having a longitudinal axis.

15. An apparatus as set forth in claim 14, wherein said tubular member is mounted to be freely rotatable about its longitudinal axis.

16. An apparatus as set forth in claim 13, wherein each of said guide means includes a portion of stretched cable.

17. An apparatus as set forth in claim 13, wherein the mounting of said fixed guide means between the respective pulley means and the bracket stabilized said pulley means.

18. An apparatus as set forth in claim 9, wherein said balanced connecting member is in the shape of a triangular plate having first means for connecting the first cable generally at an apex of the triangle, said plate including second means for connecting further cables and conductors along a base thereof.

19. An apparatus as set forth in claim 18, wherein said second means for connecting are disposed symmetrically relative to a line passing through the apex and perpendicular to the base of said triangular plate.

20. An apparatus as set forth in claim 19, wherein said second means for connecting are asymmetrically disposed on said plate for attaching the further cables.

21. An apparatus as set forth in claim 18, wherein said second means for connecting further cables and conductors are mounted on said plate in a freely rotatable manner.

22. An apparatus as set forth in claim 18, and further comprising:
   a counter-weight attached to said plate for stabilizing said plate in a horizontal position.

23. An apparatus as set forth in claim 9, wherein said first pulley means includes a sheave having a groove opening upwardly above the top of the pylon.

24. An apparatus as set forth in claim 9, wherein said first pulley means is mounted on a central point of said pylon.

25. An apparatus as set forth in claim 9, wherein said pylon is in the shape of a Y and said first pulley means is mounted on an apex of the center of a line crossing the top of the Y shape.

* * * * *